United States Patent [19]

Eling et al.

[11] Patent Number: 4,996,241

[45] Date of Patent: Feb. 26, 1991

[54] POLYISOCYANURATE RIGID FOAMS

[75] Inventors: Berend Eling, Wezembeek-Oppem; Colin R. Tweedale, Overijse, both of Belgium

[73] Assignee: Imperial Chemical Industries PLC, Millbank, London, England

[21] Appl. No.: 414,824

[22] Filed: Oct. 17, 1989

Related U.S. Application Data

[63] Continuation of Ser. No. 196,158, May 19, 1988, abandoned.

[30] Foreign Application Priority Data

May 26, 1987 [GB] United Kingdom ............... 8712363

[51] Int. Cl.$^5$ .................. C08G 18/18; C08G 18/22; C08G 18/76
[52] U.S. Cl. .................................. 521/107; 521/108; 521/124; 521/125; 521/132; 521/160; 521/170; 521/172; 521/174
[58] Field of Search ............... 521/107, 108, 124, 125, 521/132, 160, 170, 172, 174

[56] References Cited

U.S. PATENT DOCUMENTS

| 3,936,483 | 2/1976 | Gemeinhardt | 521/160 |
|---|---|---|---|
| 4,200,699 | 4/1980 | Treadwell | 521/124 |
| 4,256,847 | 3/1981 | Spector | 521/117 |
| 4,362,678 | 12/1982 | Skowronski et al. | 264/46.3 |
| 4,405,725 | 9/1983 | Bernard et al. | 521/112 |
| 4,555,418 | 11/1985 | Snider et al. | 427/373 |
| 4,623,673 | 11/1986 | DeGieuseppi et al. | 521/110 |
| 4,711,912 | 12/1987 | Snider et al. | 521/125 |
| 4,758,607 | 7/1988 | Hallmark et al. | 521/172 |
| 4,760,099 | 7/1988 | Canaday et al. | 521/125 |
| 4,771,025 | 9/1988 | Eling et al. | 521/128 |
| 4,868,043 | 9/1989 | Eling et al. | 521/125 |

FOREIGN PATENT DOCUMENTS

| 0010407 | 4/1980 | European Pat. Off. |
| 3245678 | 6/1987 | Fed. Rep. of Germany |
| 1433641 | 4/1976 | United Kingdom |
| 2041953 | 9/1980 | United Kingdom |

OTHER PUBLICATIONS

Cunningham et al.; "A Study of the Low Smoke Potential, Flame Resistance and Processibility of High Index Polyisocyanurate Rigid Foam"; Polyurethanes World Congress 1987; Sep. 29, 1987; pp. 454–461.

Primary Examiner—John Kight, III
Assistant Examiner—Rabon Sergent

[57] ABSTRACT

Polyisocyanurate Rigid Foams having improved fire resistance and smoke emission characteristics can be achieved by employing high isocyanurate index (e.g., at least 500) together with a high relative amount of the polyisocyanurate in the foam formulation. Trimerization catalysts can be employed to prepare the polyisocyanurate foam.

3 Claims, No Drawings

POLYISOCYANURATE RIGID FOAMS

This is a continuation of co-pending application Ser. No. 07/196,158 filed on May 19, 1988, now abandoned.

This invention relates to rigid polyisocyanurate foams and especially to a method for their production.

The production of rigid foams from organic polyisocyanates and polyols has been well established for over thirty years. During this time, the foams have become increasingly important as insulating materials and structural components in the construction, transport and other industries because of their ease of manufacture and outstanding thermal insulation properties.

However, polyurethane foams, like most other organic materials, are readily combustible and, in order to comply with increasingly stringent regulations and codes of practice, strenuous efforts have been made to develop rigid foams possessing improved flame retardancy characteristics. Most methods of improving the fire resistance of rigid foam have included the incorporation of an organic phosphorus and/or halogen containing compound, either of the reactive or additive type, in the foam-forming reaction mixture. The major draw-back of this approach is that the incorporation of fire retardants, whilst improving flame resistance, vastly increases the development of smoke and the concentration of toxic pyrolytic decomposition products. Consequently, the emphasis in recent years has been on the development of rigid foams containing heat resistant groups, such as the isocyanurate group, as an integral part of the polymeric structure. Not only does the presence of the isocyanurate ring structure in polyurethane foams increase the resistance to pyrolysis, but also the smoke emission is reduced.

Isocyanurate-modified polyurethane foams, commonly described merely as polyisocyanurate foams, are generally made by including a trimerisation catalyst in the formulation and using a higher isocyanate index (higher NCO/OH ratio) than in conventional polyurethane formulations as described, for example, in our United Kingdom patent specifications Nos. 1146661, 1184893 and 1223415. The polyisocyanate employed is usually a polymethylene polyphenylene polyisocyanate composition also known as polymeric or crude MDI.

In general, the resistance to pyrolysis of polyisocyanurate foams, as indicated by the oxygen index (determined according to ASTM D2863), increases with the isocyanate index.

It has now been found out, however, that further improvements in the fire resistance and smoke emission characteristics of high isocyanate index polyisocyanurate rigid foams can be achieved by employing high isocyanate index together with a high relative amount of the polyisocyanate in the foam formulation.

Accordingly, the invention provides a method for the preparation of a polyisocyanurate foam which comprises reacting a polymethylene polyphenylene polyisocyanate composition with a polyfunctional active hydrogen compound in the presence of a trimerisation catalyst and an inert volatile blowing agent, the isocyanate index of the foaming composition being at least 750 and the weight of polyisocyanate composition being at least 80% of the combined weights of the polyisocyanate composition and active hydrogen compound.

The invention also provides a method for the preparation of a polyisocyanurate foam which comprises reacting a polymethylene polyphenylene polyisocyanate composition with a polyfunctional active hydrogen compound in the presence of a trimerisation catalyst and an inert volatile blowing agent, the isocyanate index of the foaming composition being at least 500 and the weight of polyisocyanate composition being at least 80% of the combined weights of the polyisocyanate composition and active hydrogen compound, wherein the polymethylene polyphenylene polyisocyanate composition contains 0–20% of diphenylmethane diisocyanates, 40–80% of dimethylene triphenylene triisocyanates, 5–25% of polymethylene polyphenylene tetra- and pentaisocyanates and 0–15% of higher polymethylene polyphenylene polyisocyanates on a weight basis.

In a further aspect, the invention provides a method for the preparation of a polyisocyanurate foam which comprises reacting a polymethylene polyphenylene polyisocyanate composition with a polyfunctional active hydrogen compound in the presence of a trimerisation catalyst and an inert volatile blowing agent, the isocyanate index being at least 500 and the weight of polyisocyanate composition being at least 80% of the combined weights of the polyisocyanate composition and active hydrogen compound, wherein the trimerisation catalyst comprises a mixture of a salt of the formula:

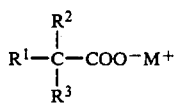

and a salt of the formula:

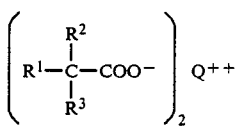

wherein M represents an alkali metal or tetra-alkylammonium, Q represents a group IIA metal or zinc and $R^1$, $R^2$ and $R^3$, which may be the same or different, represent hydrogen, lower alkyl, cycloalkyl, phenyl or alkylphenyl.

In a still further aspect, the invention provides a method for the preparation of a polyisocyanurate foam which comprises reacting a polymethylene polyphenylene polyisocyanate composition with a polyfunctional active hydrogen compound in the presence of a trimerisation catalyst and an inert volatile blowing agent, the isocyanate index being at least 500 and the weight of polyisocyanate composition being at least 80% of the combined weights of the polyisocyanate composition and active hydrogen compound, wherein the reaction is performed in the presence of a fire retardant containing at least one phosphorus and/or halogen atom. Polymethylene polyphenylene polyisocyanate compositions useful in the method of the invention have been fully described in the prior art. In general, they are mixtures of polyisocyanates of the formula:

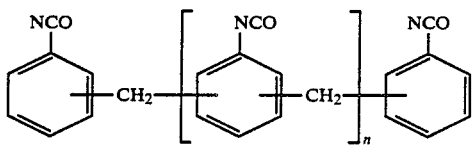

where n is an integer from 0 to 8. Such compositions may be obtained directly by the phosgenation of the polyamine mixtures produced by the acid condensation of aniline and formaldehyde or, if desired, the distribution of the individual components of the polyisocyanate mixture may be changed by treatment of the polyamine mixtures or the polyisocyanates themselves.

Polyisocyanate compositions containing relatively low proportions of diisocyanates are preferred, it having been observed that the oxygen index increases with decreasing diisocyanate content. Particularly good results have been obtained using polyisocyanate mixtures having reduced contents of diisocyanates and higher molecular weight polyisocyanates and correspondingly increased contents of tri- to penta-isocyanates. As examples of such mixtures, there may be mentioned compositions containing 0-20% of diphenylmethane diisocyanates, 40-80% of dimethylene triphenylene triisocyanates, 5-25% of trimethylene-tetraphenylene tetraisocyanate and tetramethylen-pentaphenylene pentaisocyanate and 0-15% of higher polymethylene polyphenylene polyisocyanates on a weight basis.

Polyfunctional active hydrogen compounds which may be employed in the method of the invention particularly include polyols containing two or more hydroxyl groups per molecule. The average hydroxyl value of the polyol or polyol mixture should range between 100 and 550 mg KOH/g and preferably between 200 mg KOH/g and 400 mg KOH/g. Examples of such active compounds include polypropylene glycols, other polyoxyalkylene polyols and polyesters. Also some high molecular weight monovalent alcohols as for instance ethoxylated fatty alcohols may be incorporated.

Suitable trimerisation catalysts are well known in the art and include quaternary ammonium hydroxides, alkali metal and alkaline earth metal hydroxides, alkoxides and carboxylates, for example potassium acetate and potassium 2-ethylhexoate, certain tertiary amines and non-basic metal carboxylates, for example lead octoate.

Particularly useful catalysts, especially in terms of foam processability, comprise mixtures of a salt of the formula:

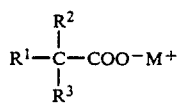

and a salt of the formula:

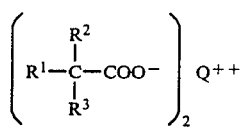

wherein M represents an alkali metal or tetra-alkylammonium, Q represents a group IIA metal or zinc and $R^1$, $R^2$ and $R^3$, which may be the same or different, represent hydrogen, lower alkyl, cycloalkyl, phenyl or alkylphenyl.

Suitable blowing agents include low boiling halogenated hydrocarbons, for example trichlorofluoromethane or methylene chloride.

The expression "isocyanate index" used herein has its usual meaning. Thus, an isocyanate index of 500 indicates that the polyisocyanate composition and polyfunctional active hydrogen compound are used in such proportions that the NCO/OH ratio is 5.0.

Polyisocyanurate foams may be prepared in accordance with the method of the invention using conventional equipment and techniques and the formulations may contain other useful ingredients, for example urethane catalysts such as N,N-dimethylcyclohexylamine or triethylene diamine and surfactants, especially of the silicone type.

The foams obtained by the method of the invention are characterized by excellent fire resistance as indicated by the oxygen index and the Kleinbrenner or B-2 test (DIN 4102-Part 1) even in the absence of added fire retardant. Further improvements may be obtained by the inclusion of fire retardants containing phosphorus or halogen atoms, for example dimethyl methylphosphonate or tris(chloropropyl) phosphate. At the high isocyanate indices employed, the increase in smoke emission resulting from the inclusion of fire retardants is much less than that observed when lower indices are used.

In particular, it has been found that the incorporation of low levels of fire retardant, that is to say less than 0.4 gram atom of fire retardant element (for example phosphorus, bromine or chlorine) per kilogram of foam, significantly increases the fire resistance of foams, as measured in the above mentioned test, without increasing smoke emission to any significant degree. These levels of fire retardant are represented by the use of, for example about 0.25% by weight of elemental phosphorus (which may be used in the form of, for example 25% dimethyl methylphosphonate). Preferred ranges of fire retardant are from about 0.1% by weight to about 0.25% by weight of elemental phosphorus.

The method of the invention is particularly suitable for the production of fire resistant structural elements using conventional lamination techniques.

The invention is illustrated but not limited by the following Example in which all parts are by weight.

EXAMPLE

The following tables identify formulations used on a laminating machine at two isocyanate index levels and the properties of the foams obtained.

TABLE 1

| Characterization of the formulations. | | |
| --- | --- | --- |
| Experiment | 1 | 2 |
| Polyester polyol (a) | 10.2 | 5.1 |
| Dimethyl methylphosphonate | 0.80 | 0.80 |
| Silicon surfactant (b) | 1.20 | 1.20 |
| Emulsifier (c) | 1.60 | 1.62 |
| Trichlorofluoromethane | 12.0 | 11.3 |
| Dimethylcyclohexylamine | 0.80 | 0.81 |
| Catalyst A (d) | 1.60 | 1.62 |
| Catalyst B (e) | 2.40 | 2.43 |
| Isocyanate (f) | 69.6 | 74.5 |
| Isocyanate index | 767 | 1360 |
| weight fraction of (g) | 0.835 | 0.900 |

TABLE 1-continued

Characterization of the formulations.

| Experiment | 1 | 2 |
|---|---|---|
| isocyanate | | |

(a) Daltolac P 520, a low molecular weight polyester polyol, ICI Polyurethanes, hydroxyl value is 295 mg KOH/g.
(b) Surfactant SR 234, BP Chemicals.
(c) Cirrasol EN-MP, a fatty alcohol/ethylene oxide condensate, ICI Organics Division, hydroxyl value is 154 mg KOH/g.
(d) 65 weight % of potassium 2-ethylhexanoate in polypropylene glycol with an average molecular weight of 425.
(e) 40 weight % of calcium 2-ethylhexanoate in polypropylene gylcol with an average molecular weight of 425.
(f) "Suprasec" 5005, polymeric MDI, ICI Polyurethanes, isocyanate value is 30.6.
(g) ratio of weight of isocyanate and combined weight of isocyanate and active hydrogen compound.

TABLE 2

| Experiment | Physical properties. | | 1 | 2 |
|---|---|---|---|---|
| Oxygen Index (ASTM D2863) | (%) | | 25.7 | 27.6 |
| Butler Chimney (ASTM D3014) | (% weight retained) | | 91.9 | 94.0 |
| Kleinbrenner 'K' (DIN 4102 Part 1) | class | | B-2 | B-2 |
| | cm flame height | | 7/8 | 6/7 |
| NBS-smoke test (ASTM E662) | specific optical density | | 110 | 110 |
| Dim. stab. (DIN 53431) | 1 day - | 15 Deg. C. (%) | 0.1 | 0.1 |
| | | 100 Deg. C. (%) | 0.4 | 0.3 |
| | | 140 Deg. C. (%) | 0.3 | 0.6 |
| | 14 days - | 15 Deg C. (%) | 0.2 | 0.2 |
| | | 100 Deg. C. (%) | 0.3 | 0.3 |
| | | 140 Deg. C. (%) | 0.5 | 0.8 |
| Density (DIN 53420) | Core (kg/m³) | | 36.5 | 40.3 |
| | Overall | | 40.4 | 44.1 |
| Conductivity (DIN 52612) | (mW/m Deg. K) | | 21.6 | 24.1 |
| Friability (BS 4370 Method 12) | (%) | | 35.5 | 35.1 |
| Closed cells (ISO 4590) | (%) | | 90.1 | 90.3 |
| Compression | at 10% comp (kPa) | | 133 | 120 |

TABLE 2-continued

| Experiment | Physical properties. | 1 | 2 |
|---|---|---|---|
| (DIN 53421) | perpendicularly to rise direction | | |
| | parallel to rise direction | 170 | 172 |
| | diagonally to rise direction | 152 | 135 |

We claim:
1. In paragraph (b) delete the formula

"$R^1R^2R^3C-CO_2M$"

and substitute therefore the following structure:

$$R_1-\underset{\underset{R_3}{|}}{\overset{\overset{R_2}{|}}{C}}-\overset{\overset{O}{\|}}{C}-O^- \, M^+$$

in paragraph (c) delete the structure:

"$[R^1R^2R^3C-CO_2]_2-Q$"

and substitute therefore the structure:

$$(R_1-\underset{\underset{R_3}{|}}{\overset{\overset{R_2}{|}}{C}}-\overset{\overset{O}{\|}}{C}-O^-)_2 \, Q^{++}$$

2. A method of claim 1 wherein said tertiary amine is selected from the group consisting of N,N-dimethylcyclohexylamine and tetraethylenediamine and M is potassium and Q is calcium.

3. A method of claim 1 wherein said trimerization catalyst consists essentially of dimethylcyclohexylamine, potassium 2-ethylhexanoate and calcium 2-ethylhexanoate.

* * * * *

UNITED STATES PATENT AND TRADEMARK OFFICE
CERTIFICATE OF CORRECTION

PATENT NO. : 4,996,241

DATED : February 26, 1991

INVENTOR(S) : Berend Eling and Colin R. Tweedale

It is certified that error appears in the above-identified patent and that said Letters Patent is hereby corrected as shown below:

Col. 6, Delete claim 1 and substitute the following:

1. In a method for the preparation of a polyisocyanurate foam in a laminating machine which comprises reacting a polymethylene polyphenylene polyisocyanate having 0-20% by weight diphenylmethane diisocyanates, 40-80% by weight dimethylene triphenylene triisocyanate, 5-25% by weight of polymethylene polyphenylene tetra and penta isocyanates and 0-15% by weight of higher polymethylene polyphenylene polyisocyanates with a polyol at an isocyanate index of at least 500 in the presence of a trimerization catalyst and a blowing agent, the improvement which comprises employing a said trimerization catalyst (a) at least one tertiary amine catalyst, and (b) a salt of the formula

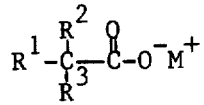

$$R^1-\underset{R^3}{\overset{R^2}{C}}-\overset{O}{\overset{\|}{C}}-O^- M^+$$

wherein M represents an alkali metal or tetraalkyl ammonium cation, and

UNITED STATES PATENT AND TRADEMARK OFFICE
CERTIFICATE OF CORRECTION

PATENT NO. : 4,996,241

DATED : February 26, 1991

INVENTOR(S) : Berend Eling and Colin R. Tweedale

It is certified that error appears in the above-identified patent and that said Letters Patent is hereby corrected as shown below:

(c) a salt of the formula

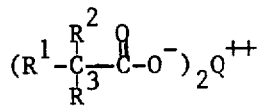

wherein Q is a Group II A metal or zinc, wherein $R^1$, $R^2$ and $R^3$ may be the same or different, represent lower alkyl, cycloalkyl, phenyl or alkylphenyl groups.

Signed and Sealed this

Fifteenth Day of September, 1992

Attest:

DOUGLAS B. COMER

*Attesting Officer*     *Acting Commissioner of Patents and Trademarks*